May 5, 1953 C. A. NICHOLS ET AL 2,637,070
APPARATUS FOR HEATING COMMINUTED MOLDING MATERIAL
Original Filed Sept. 17, 1947 12 Sheets-Sheet 1

Fig. 1

INVENTORS
CHARLES A. NICHOLS
MAX E. TODD
WILLIAM A. FLETCHER
CLARENCE J. KELLER
BY Spencer, Hardman & Fehr
THEIR ATTORNEYS May 5, 1953   C. A. NICHOLS ET AL   2,637,070
APPARATUS FOR HEATING COMMINUTED MOLDING MATERIAL
Original Filed Sept. 17, 1947   12 Sheets-Sheet 2

INVENTORS
CHARLES A. NICHOLS
MAX E. TODD
WILLIAM A. FLETCHER
CLARENCE J. KELLER
BY Spencer, Hardman & Fehr
THEIR ATTORNEYS

Fig. 5

May 5, 1953  C. A. NICHOLS ET AL  2,637,070
APPARATUS FOR HEATING COMMINUTED MOLDING MATERIAL
Original Filed Sept. 17, 1947  12 Sheets-Sheet 8

INVENTORS
CHARLES A. NICHOLS
MAX E. TODD
WILLIAM A. FLETCHER
CLARENCE J. KELLER
BY Spencer, Hardman & Fehr
THEIR ATTORNEYS May 5, 1953  C. A. NICHOLS ET AL  2,637,070
APPARATUS FOR HEATING COMMINUTED MOLDING MATERIAL
Original Filed Sept. 17, 1947  12 Sheets-Sheet 9

INVENTORS
CHARLES A. NICHOLS
MAX E. TODD
WILLIAM A. FLETCHER
CLARENCE J. KELLER
BY Spencer, Hardman & Feher
THEIR ATTORNEYS May 5, 1953  C. A. NICHOLS ET AL  2,637,070
APPARATUS FOR HEATING COMMINUTED MOLDING MATERIAL
Original Filed Sept. 17, 1947  12 Sheets-Sheet 11

INVENTORS
CHARLES A. NICHOLS
MAX E. TODD
WILLIAM A. FLETCHER
CLARENCE J. KELLER
BY Spencer, Hardman & Fehr
THEIR ATTORNEYS May 5, 1953  C. A. NICHOLS ET AL  2,637,070
APPARATUS FOR HEATING COMMINUTED MOLDING MATERIAL
Original Filed Sept. 17, 1947  12 Sheets-Sheet 12

INVENTORS
CHARLES A. NICHOLS
MAX E. TODD
WILLIAM A. FLETCHER
CLARENCE J. KELLER
BY Spencer, Hardman & Fehr
THEIR ATTORNEYS Patented May 5, 1953

2,637,070

UNITED STATES PATENT OFFICE 2,637,070

APPARATUS FOR HEATING COMMINUTED MOLDING MATERIAL

Charles A. Nichols, Anderson, Max E. Todd, Windfall, William A. Fletcher, Daleville, and Clarence J. Keller, Anderson, Ind., assignors to General Motors Corporation, Detroit, Mich., a corporation of Delaware Original application September 17, 1947, Serial No. 774,592. Divided and this application April 7, 1950, Serial No. 154,654

6 Claims. (Cl. 18—30)

This application is a division of application, Serial No. 774,592, filed September 17, 1947, now Patent No. 2,531,524.

This invention relates to the art of molding plastic materials.

An object of the present invention is to provide apparatus for preheating molding material while in comminuted form for use by an injection molding machine which receives the preheated comminuted material and causes it to be forced into mold cavities and therein to be cured under heat and pressure. The disclosed embodiment of the invention provides a hopper for receiving molding material, a device which distributes a predetermined quantity of material from the hopper in a layer upon a heated roller from which the heated material is removed and is caused to gravitate into a compression chamber of an open molding die of the molding machine. A companion molding die is caused to be pressed against the die having the compression chamber and the preheated material therein is forced by a piston or ram out of the compression chamber through ducts or runners connected with the die cavities in which the material is cured under heat and pressure.

Further objects and advantages of the present invention will be apparent from the following description, reference being had to the accompanying drawings, wherein a preferred embodiment of the present invention is clearly shown.

Figure 1:
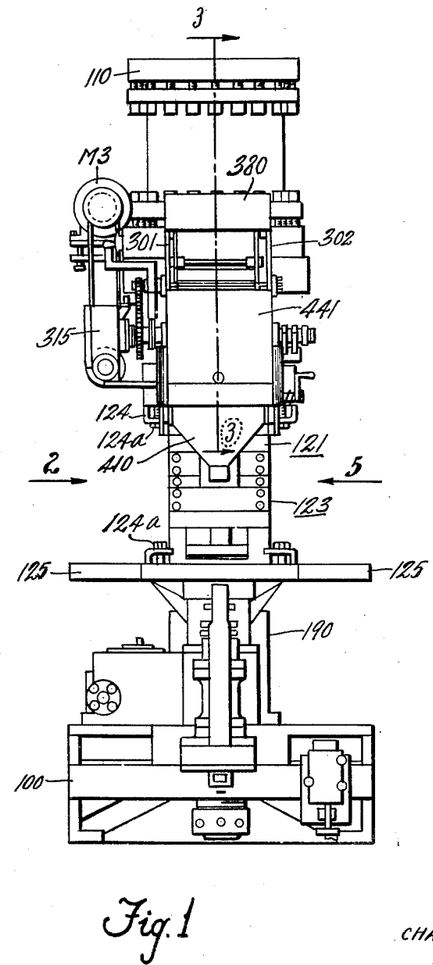
Fig. 1 is a front elevation of the molding machine and material handling apparatus.
Figure 2:
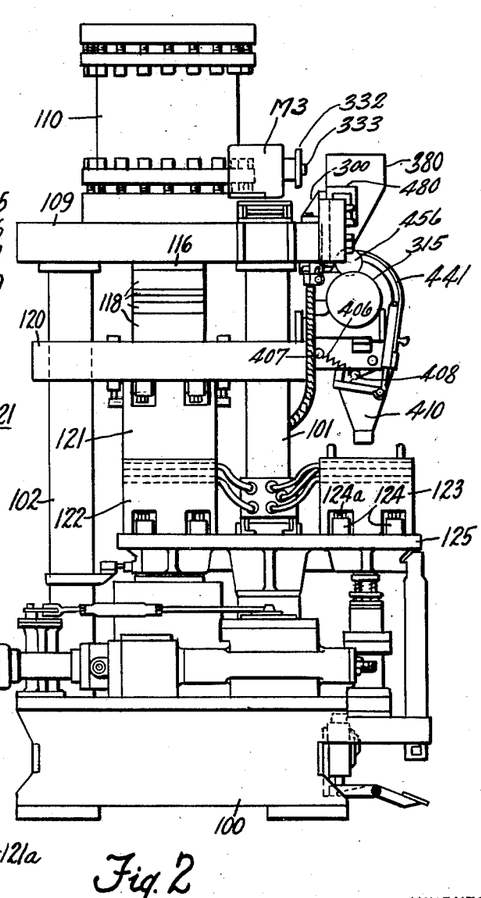
Fig. 2 is a side elevation looking in the direction of arrow 2 of Fig. 1.
Figure 3:
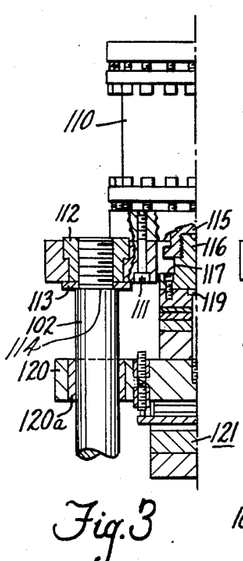
Fig. 3 is a fragmentary view partly in side elevation and partly in section, the section being taken on the line 3—3 of Fig. 1.
Figure 4:
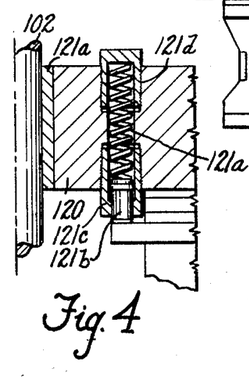
Fig. 4 is a fragmentary sectional view showing a portion of Fig. 3 on a larger scale.
Figure 5:
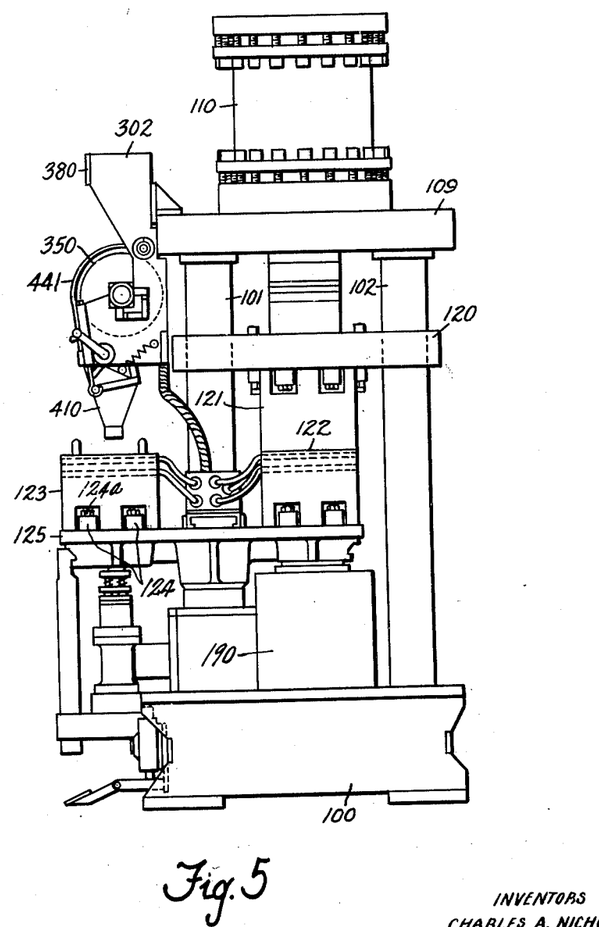
Fig. 5 is a side elevation looking in the direction of arrow 5 of Fig. 1.
Figure 6:
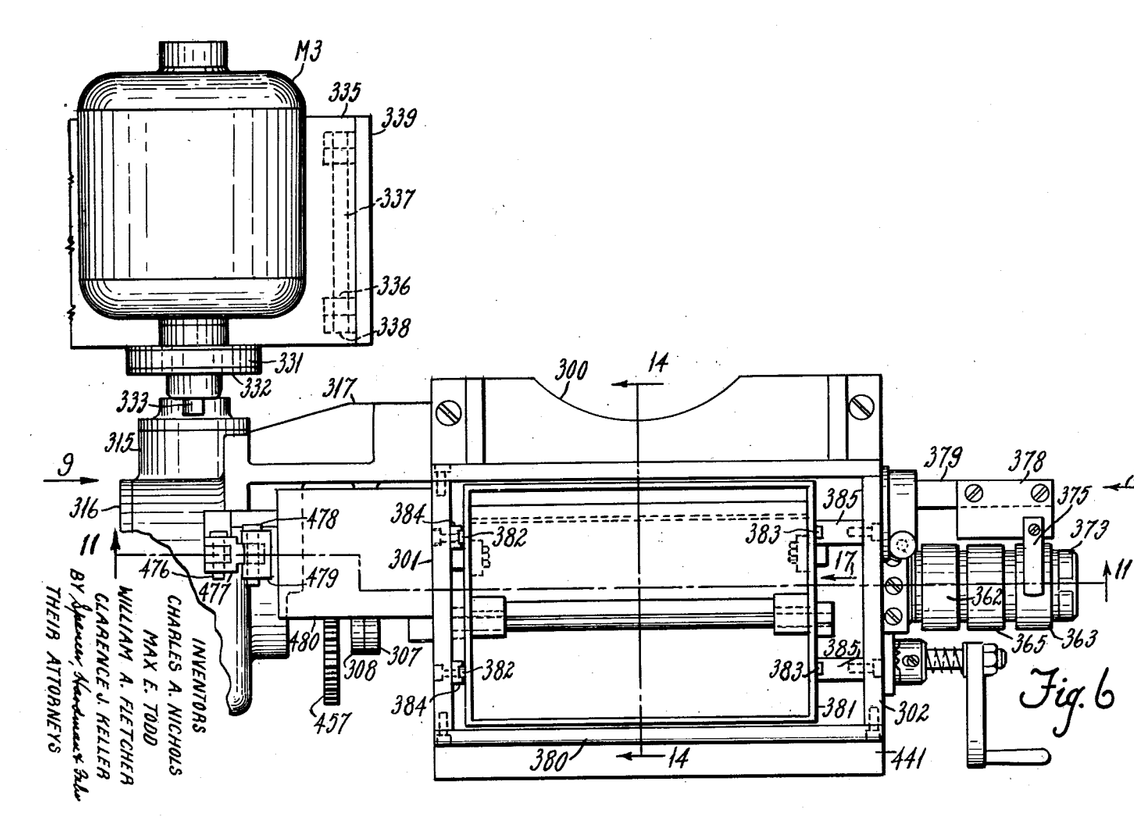
Fig. 6 is a plan view of the preheating apparatus.

Referring to Figs. 1, 2 and 5, the machine comprises a base 100 supporting posts 101 and 102 which support a bar 109 which supports a cylinder 110 attached to the bar 109 by screws 111 as shown in Fig. 3. Each of the posts 101 and 102 is attached to the bar 109 in the manner shown in Fig. 3. The threaded end of each post receives a nut 112 received by a counterbore in the bar 109. When the nut 112 is tightened, the bar 109 is clamped against a washer 113 which, in turn, is clamped against a shoulder 114 of the post. The cylinder 110 receives a piston not shown attached to a rod 115 (Fig. 3) threadedly connected with a coupling member 116 by screws 117 attached to the upper one of a plurality of spacers 118 of different thicknesses. Screws 119 attach all of these spacers to a bar 120 which supports an upper die 121. Bar 120 is provided with bearings 120a which slide on the posts 101 and 102. The upper die 121 is adapted to engage either one of two lower dies 122, 123 mounted on an oscillatable table 125. The dies 122, 123 are secured to their respective supports by angle bars 124 and screws 124a.

A cylinder 190 is attached to the table 125 and encloses a piston not shown. The movements of the table 125 causes a lower die, such as 122, to be located under the upper die 121, while the other lower die 123 is located in a position for unloading the molded parts and reloading the die with inserts, when required, and with molding powder which has been preheated in a manner to be described.

The function of the cylinder 110 (Fig. 2) is to contain the pressure fluid which raises and lowers its piston therein (not shown) which causes the upper die 121 to be pressed firmly against a lower die 122 before plastic material is forced into the mold cavities. The function of the cylinder 190 is to contain the pressure fluid which effects the movements of its piston which, through its connection with a compression ram not shown causes plastic material to be compressed in a cylinder not shown in the lower dies 122 and 123 and to flow therefrom through runners to the die cavities. The relation of the cylinder to the dies is shown and described in Serial No. 774,592 referred to. The upper die 121 is maintained forcibly against a lower die while plastic material therein is being cured under pressure and heat supplied by the heating elements within the dies. After the curing cycle, the die beneath the upper die 121 is moved by rotation of the table 125 into a position for unloading and reloading and it is replaced by a loaded lower die.

Figure 7:
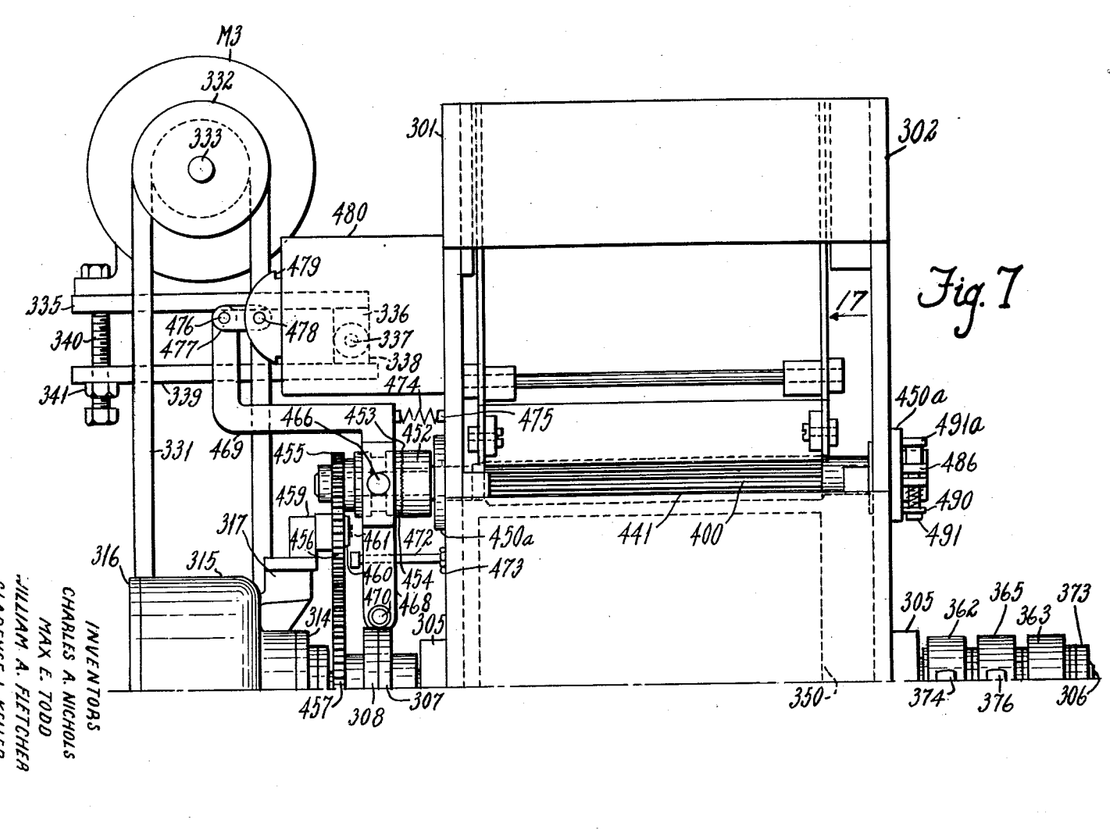
Figs. 7 and 8 together form a front view of the preheating apparatus.
Figure 8:
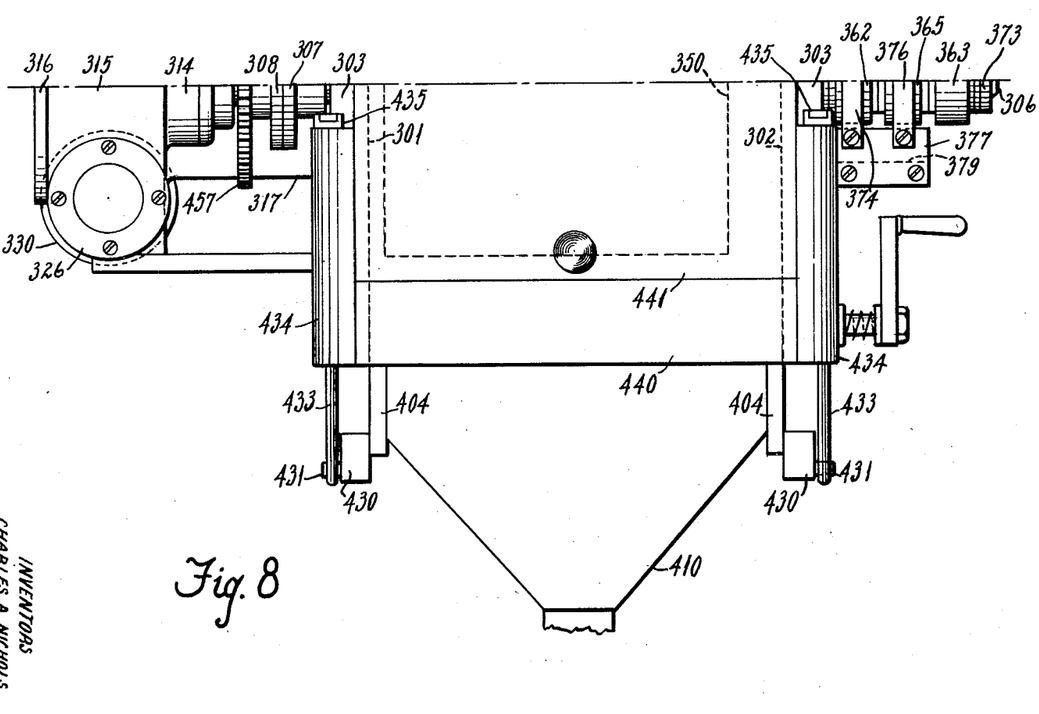
Figures 9, 10:
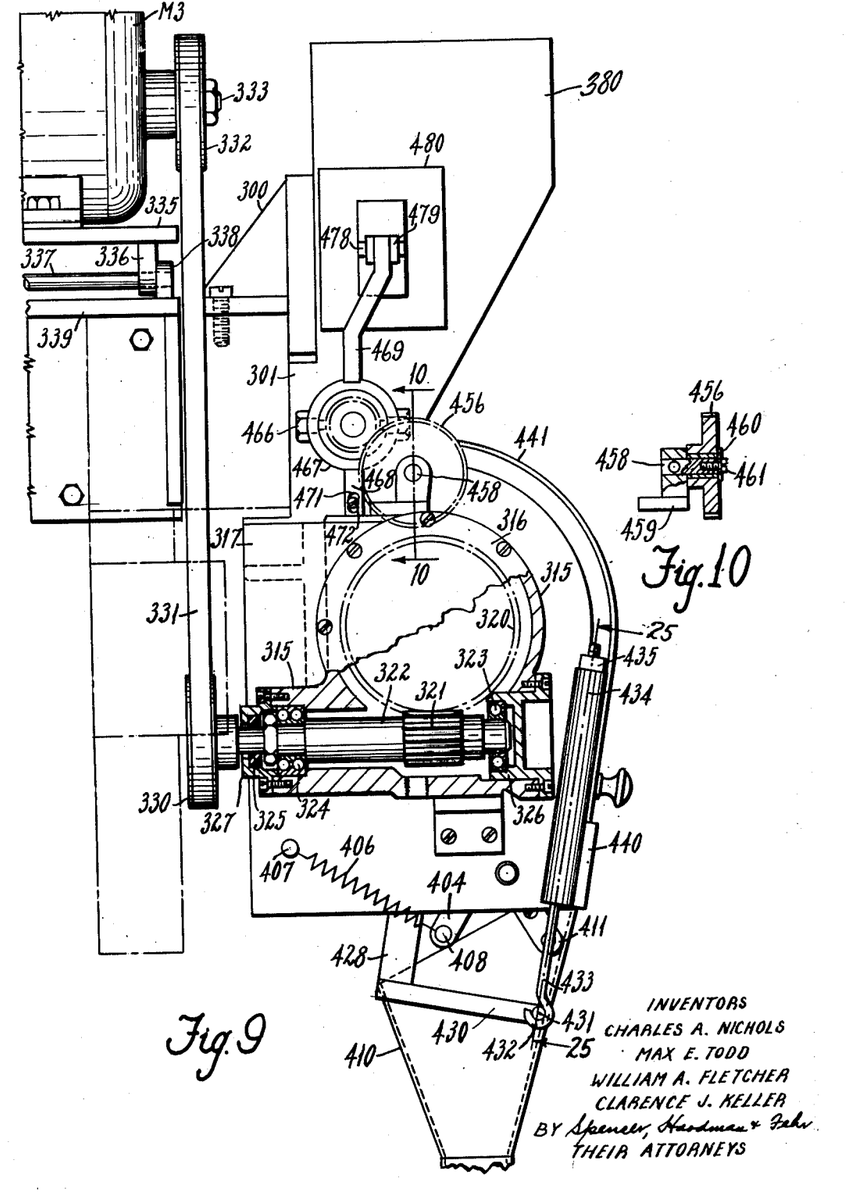
Fig. 9 is a side view looking in the direction of the arrow 9 of Fig. 6.
Fig. 10 is a fragmentary sectional view on line 10—10 of Fig. 9.

The apparatus for preheating the molding material comprises a bracket 300 attached to frames 301 and 302 (Figs. 6, 7, 8, 9, 11) which provide bearing holder half-shells 303 which support bearings 304 retained by bearing holder caps 305 attached to part 303. Bearings 304 support a shaft 306 connected by couplings 307 and 308 with a shaft 309 passing through an oil seal 310 and journaled in bearings 311 and 312, supported respectively by a plate 314, a gear housing 315 and a plate 316 which are attached together, the housing 315 being integral with a bracket 317 attached to frame 301 which supports another bracket 318 attached to housing 315. Housing 315 encloses a worm gear 320 attached to shaft 309 and a worm 321 meshing with gear 320 and integral with a shaft 322 which is supported by bearings 323 and 324 (Fig. 9) carried respectively by a cap 326 and housing 315 and extending through an oil seal 325 in a cap 327. Shaft 322 is connected with a pulley 330 which a belt 331 connects with a pulley 332 on the shaft 333 of a motor M3 which is supported by a table 335 having ears 336 which a rod 337 pivotally connects with ears 338 of a bracket 339 which, like bracket 300, is supported by the molding machine. The belt 331 is tightened by turning a screw 340 threaded through bracket 339 and engaging the table 335, the screw 340 being fixed by a lock nut 341 (Fig. 7). So long as motor M3 operates, the shaft 306 rotates.

Figures 11, 12, 13:
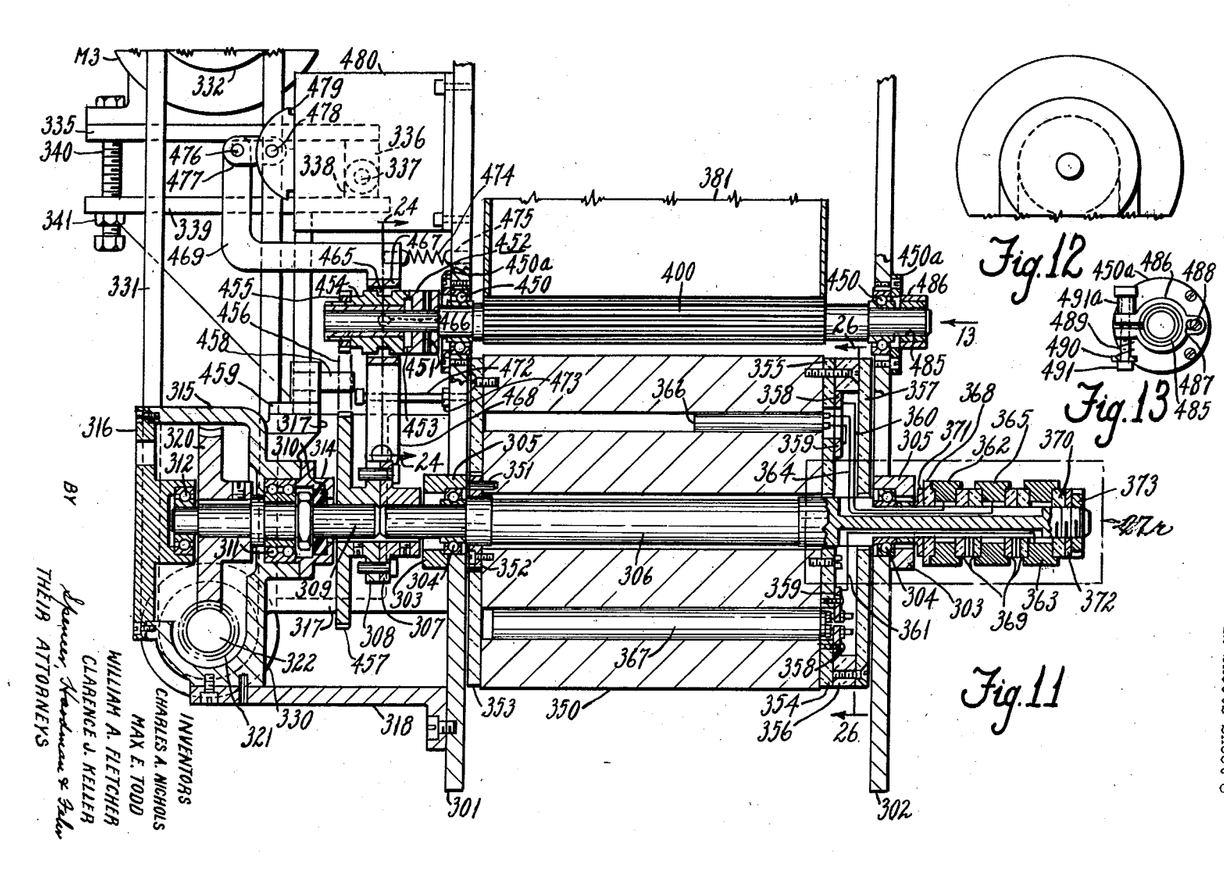
Figs. 11 and 12 together form a sectional view on line 11—11 of Fig. 6.
Fig. 13 is a fragmentary view in the direction of arrow 13 of Fig. 11.
Figures 16, 17, 18, 19:
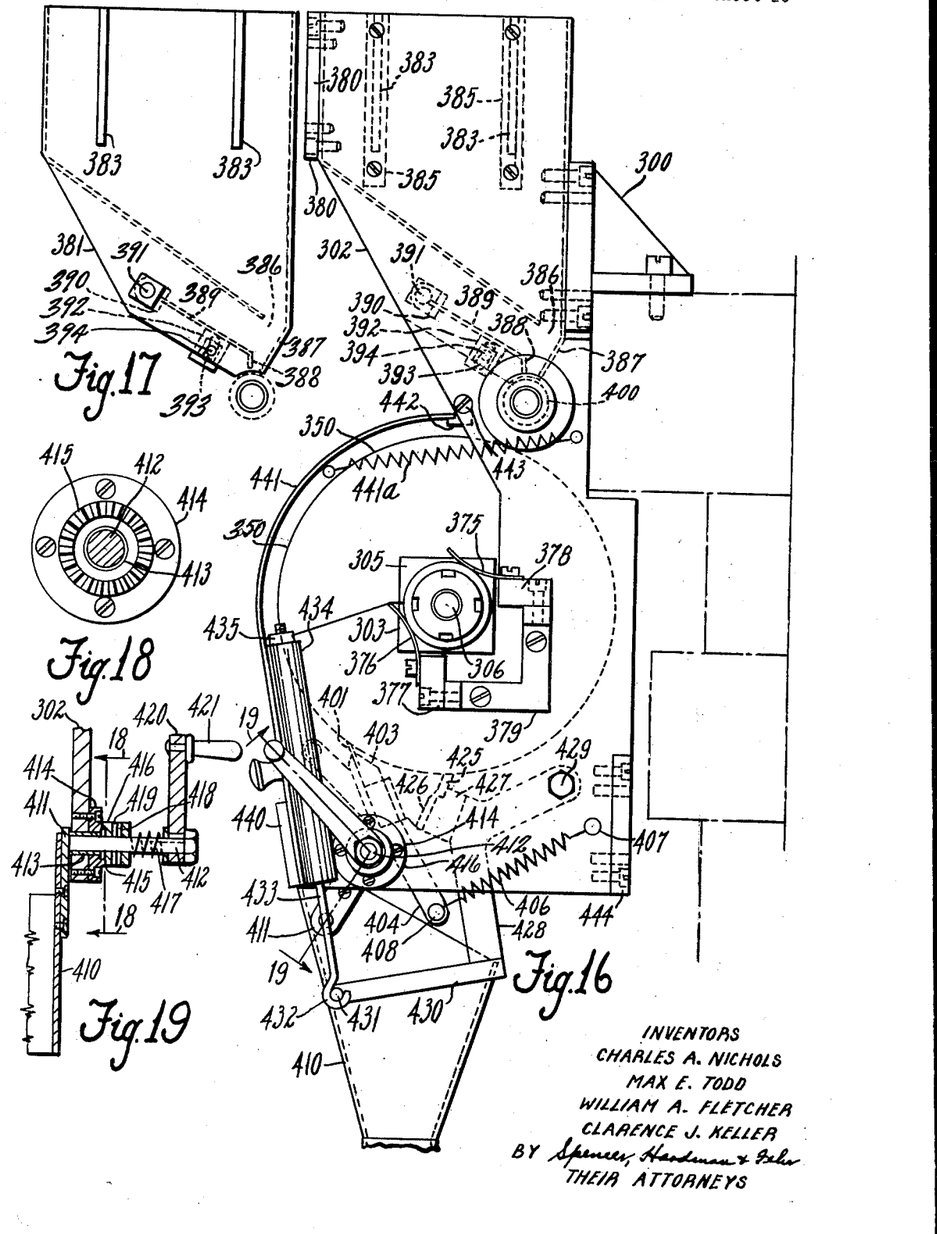
Fig. 16 is a side view looking in the direction of arrow 16 of Fig. 6.
Fig. 17 is a side view of a hopper looking in the direction of arrow 17 of Fig. 7.
Fig. 18 is a fragmentary sectional view on line 18—18 of Fig. 19.
Fig. 19 is a fragmentary sectional view on the line 19—19 of Fig. 16.
Figure 20:
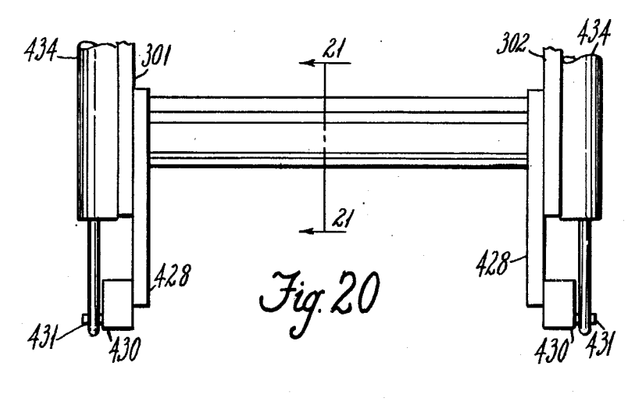
Fig. 20 is a front view of the roller cleaner assembly.

Shaft 306 supports and drives a heated steel cylinder 350 having a polished chromium surface on which the molding material is deposited and heated. Cylinder 350 is driven by pins 351 connected with a collar 352 welded to shaft 306. The ends of cylinder 350 are thermally insulated by transit rings 353, 354 and 355 in direct engagement with the cylinder 350 which supports also a transit ring 356 and disc 357 which enclose electrical connectors comprising copper rings 358 and 359, which wires 360 and 361, respectively, connect with collector rings 362 and 363 and a wire 364 connected with ring 365 and with a thermal switch 366 in the cylinder 350. Rings 358 and 359 are connected, respectively, with the terminals of heating element 367 as shown in Fig. 11. Collector rings 362, 363 and 365 are supported by and driven by shaft 306 and are insulated therefrom by discs 368, 369 and 370 clamped between washers 371 and 372 by a nut 373 threaded on shaft 306. Rings 362, 363 and 365 are engaged by brushes 374, 375 and 376 respectively, supported by non-conducting blocks 377 and 378 supported by a bracket 379 attached to frame 302 (Fig. 16).

The frames 301 and 302 together with the bracket 300 and a bar 380 (attached to frames 301 and 302) provide a pocket for a hopper 381 having ribs 382 and 383 (Fig. 6) received by grooved bars 384 and 385, respectively, attached to frames 301 and 302 respectively. These ribs bottom in the lower ends of the grooves of the bars to support the hopper. The molding material gravitates through an opening 386 (Fig. 14) in the bottom of the hopper and between a flange 387 provided by the hopper rear wall and a flange 388 of a plate 389 attached to lugs 390 pivoted on studs 391 attached to the hopper side walls. Plate 389 has ears 392, through the arcuate slots 393 thereof, there pass screws 394 threaded into the housing side walls. By loosening the screws 394, the flange 388 can be adjusted vertically to determine the thickness of the layer of material deposited upon a spreader roller 400.

Figures 21, 23:
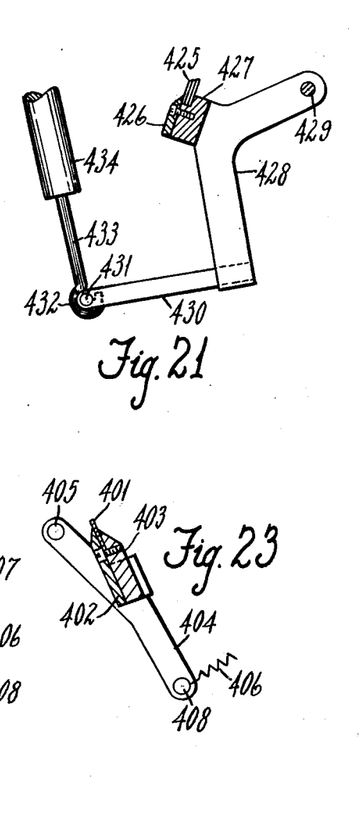
Fig. 21 is a sectional view on line 21—21 of Fig. 20.
Fig. 23 is a sectional view on line 23—23 of Fig. 22.
Figure 22:
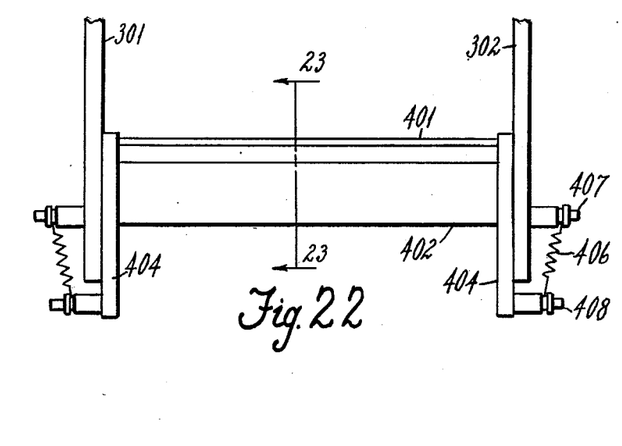
Fig. 22 is a front view of the roller scraper assembly.

Spreader roller 400 is straight-knurled longitudinally with V-grooves about $\frac{1}{32}''$ deep. It rotates counterclockwise (Fig. 14) and carries the molding material from between the flanges 387 and 388 and drops it upon the heated cylinder 350 in an even layer. As the cylinder 350 rotates counterclockwise, the material is heated and it softens sufficiently to cause the particles to stick together or to the roller so that it does not drop from the roller until removed by a scraper 401 clamped by a bar 402 (Fig. 23) against a bar 403 attached to arms 404 pivoted on pins 405 supported by frames 301 and 302 (Fig. 22). Springs 406, connecting studs 407 on these frames with studs 408 on the arms 404, urge the scraper 401 against the cylinder 350.

The material removed by the scraper gravitates into a funnel 410 attached to arms 411 (Fig. 16) pivotally supported by frames 301 and 302. As shown in Fig. 19, one of the arms 411 is attached to a shaft 412 journaled in a bearing 413 supported by frame 302 and a fixed ratchet ring 414 having teeth 415 engaging teeth in a ring 416 which a spring 417 urges toward ring 414. Shaft 412 carries a pin 418 received by slots 419 in ring 416. When shaft 412 is turned by lever 420 having a handle 421, the ring 416 snaps longitudinally as its teeth are cammed out of the tooth space between the teeth 415 and then jump into said tooth spaces when aligned therewith. This ratchet or detent construction provides for maintaining the shaft 412 and supported funnel 410 in a desired position, one of which would be as shown when filling a mold as required and the other of which would be in a position away from the mold when unloading the molded parts and when cleaning the mold and when placing in the mold metal inserts when used.

Figure 25:
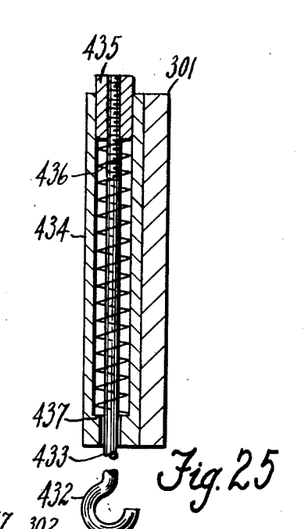
Fig. 25 is a fragmentary sectional view on line 25—25 of Fig. 9.
Figure 26:
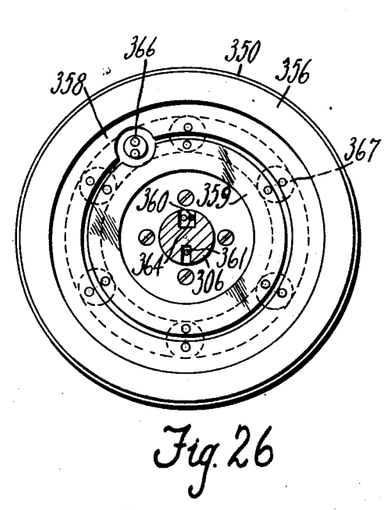
Fig. 26 is a fragmentary sectional view on line 26—26 of Fig. 11.
Figure 27:
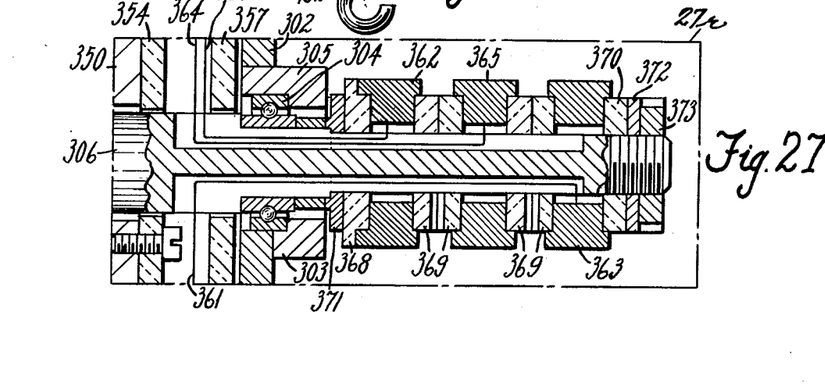
Fig. 27 is an enlarged sectional view of that portion with dot-dash rectangles 27r of Fig. 11.

The cylinder 350 is engaged by a cleaner bar 425, preferably of laminated cloth with a Bakelite binder. Bar 425 is clamped by a bar 426 (Fig. 21) against a bar 427 having arms 428 pivotally supported on pins or screw studs 429 attached to frames 301 and 302. Each arm 428 is welded to a bar 430 carrying a stud 431 engaged by a hook 432 on a rod 433 which, as shown in Fig. 25, passes through a tube 434 attached to a frame 301 or 302, and is threaded into a nut 435. A spring 436 located between the nut 435 and a shoulder 437 of the tube urges the rod 433 upwardly to force the cleaner bar 425 against the cylinder. Thus the cylinder presents a clean surface to the fresh deposit of molding material. This minimizes the possibility of delivery to the mold of any material which is cured beyond the predetermined stage of partial cure which the cylinder 350 is intended to accomplish.

The cylinder 350 and material carried thereby and dropping therefrom are enclosed by the side frames, a bar 440 (Fig. 14) attached thereto and a cover 441 attached to lugs 442 pivotally supported by pins 443 attached to the side frames. A bar 444 connects the bottom rear edges of the side frames.

The amount of the charge of molding material for a mold is determined in part by the distance of the flange 388 (Fig. 14) above the roller 400 and by the duration of roller 400. The transfer of material by the roller to the cylinder 350 is called dosing and the apparatus which controls the duration of rotation of roller 400 during each cycle of operation is called the doser.

Figure 24:
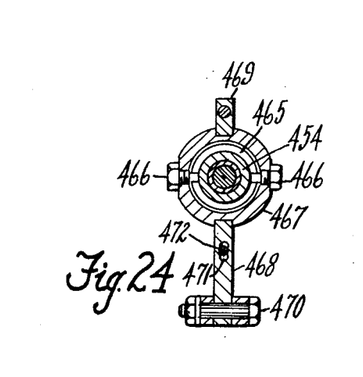
Fig. 24 is a fragmentary sectional view on line 24—24 of Fig. 11.

Referring to Fig. 11, bearings 450 supported by the frames 301 and 302 and retained by rings 450a support the roller 400 which carries a pin 451 connected with a clutch part 452 having teeth 453 engageable with similar teeth of a shiftable clutch part 454 attached to a gear 455 meshing with a gear 456 meshing with a gear 457 integral with coupling 308. Gear 456 is pivoted on a rod 458 (Fig. 10) attached to a bracket 459 supported by gear housing bracket 317 (Fig. 11). Gear 456 is retained by a washer 460 and a screw 461 threaded into rod 458. A groove 465 in clutch part 454 receives pins 466 of a yoke 467 welded to arms 468 and 469. Arm 468 is pivoted on a screw 470 threaded into bracket 317 and has a hole 471 (Fig. 24) which receives a screw 472 threaded into frame 301 and retained in the required positions of adjustment by a nut 473. The head of screw 473 limits counterclockwise rotation of arm 468 under the effect of a compression spring 474 located between arm 469 and frame 301 and retained by pins 475 in each. Arm 469 is connected by pin 476, link 477 and pin 478 with the armature 479 of a solenoid 480 whose coil is known as the doser coil. When the coil is energized, the clutch parts 452 and 454 are connected and when the coil is deenergized, the spring 474 separates these clutch parts and the shaft 400 stops practically immediately because a brake is always effective. This brake, shown in Fig. 13, comprises a drum 485 engaged by a split band 486 having a hole 487 which receives a locating screw 488. The band is urged against the drum by a spring 489 pushing against a washer 490 and the latter against the head of a screw 491 threaded into a nut 491a which is urged by the spring 489 against one part of the band while the spring pushes directly against the other part of the band.

Figures 14, 15:
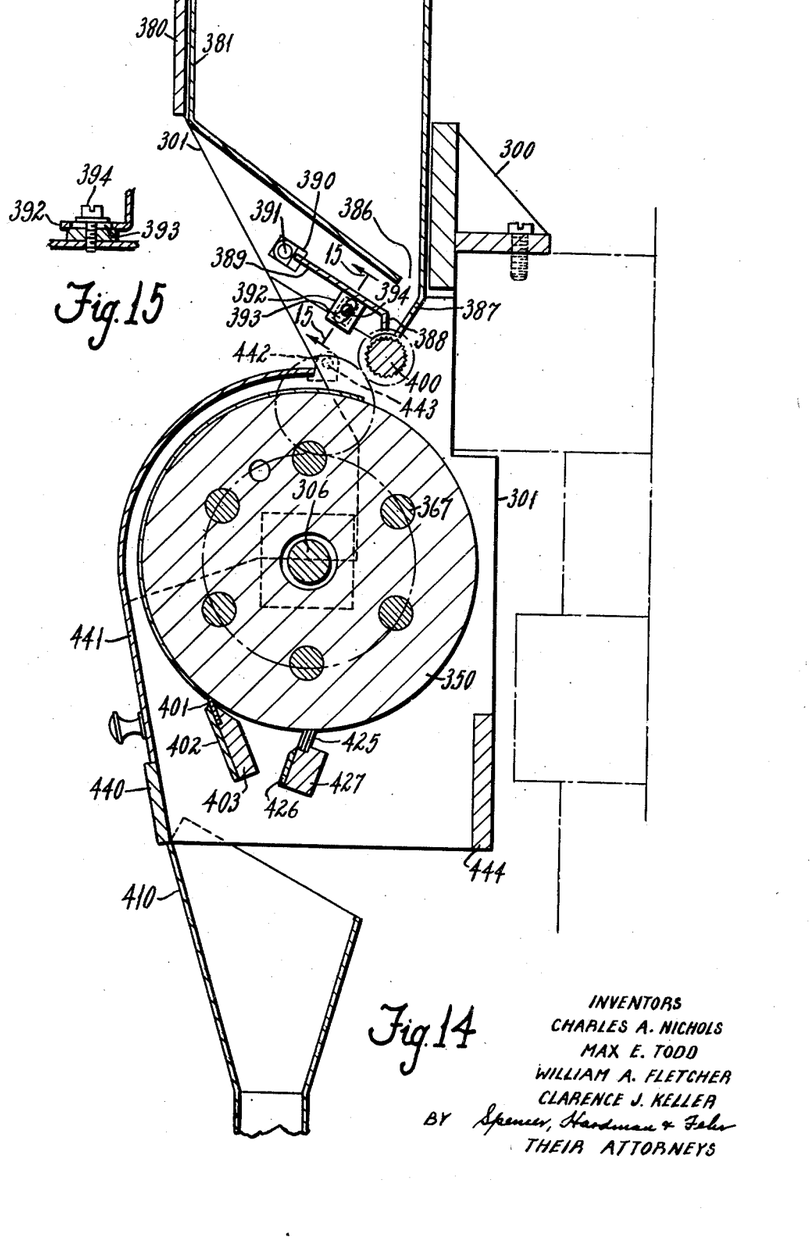
Fig. 14 is a sectional view on line 14—14 of Fig. 6.
Fig. 15 is a sectional view on line 15—15 of Fig. 14.

The cylinder heaters 367 are connected through slip rings 362, 363, 365 engaged, respectively, by brushes 374, 375, 376 with a current source and with a heat regulating apparatus in a manner disclosed in application Serial No. 774,592. The heat regulating apparatus cuts off the heaters when the temperature of cylinder 350 exceeds a certain amount and closes circuit to them when cylinder temperature falls below a certain amount. A timing mechanism disclosed in said apparatus controls the starting and the duration of the operation of the doser through control of solenoid 480. The quantity of the dose or charge of heated material supplied to the open mold is determined by the duration of operation of the doser and the material layer thickness on the spreader roller 400 by adjustment of plate 389 (Fig. 14).

While the embodiment of the present invention as herein disclosed, constitutes a preferred form, it is to be understood that other forms might be adopted.

What is claimed is as follows:

1. For use with an injection molding machine having a compression chamber, a doser comprising a hopper containing a supply of comminuted molding material, a rotating roller, means for heating the roller, a longitudinally grooved, rotatable roller positioned between the hopper and the rotative heated roller for receiving material gravitating from the hopper and depositing it upon the heated roller, means for removing heated material from the heated roller, means for guiding the material heated by the heated roller into the compression chamber of the molding machine, means for determining the thickness of the layer of material conveyed by the grooved roller to the heated roller and means for controlling the duration of rotation of the grooved roller.

2. For use with an injection molding machine having a compression chamber, a doser comprising a hopper containing a supply of comminuted molding material, a rotating roller, means for heating the roller, a longitudinally grooved, rotatable roller positioned between the hopper and the rotative heated roller for receiving material gravitating from the hopper and depositing it upon the heated roller, means for removing heated material from the heated roller, means for guiding the material heated by the heated roller into the compression chamber of the molding machine, means for determining the thickness of the layer of material conveyed by the grooved roller to the heated roller, a motor for driving the heated roller, a clutch for connecting the motor with the grooved roller and means for controlling the clutch.

3. For use with an injection molding machine having a compression chamber and comprising a frame having vertical side members spaced apart a distance for receiving the widest of a series of hoppers of different widths, each adapted to be supported by the frame and each provided with an elongated opening at the bottom thereof through which comminuted molding material in the hopper can gravitate, the width of the hopper being a factor in determining the amount of material in a charge provided by the doser, a longitudinally grooved roller rotatably supported by the side members below and in close proximity to the elongated opening in the bottom of a hopper, a material heating roller rotatably supported by the side members and located below the grooved roller and receiving material therefrom, means for heating the material heating roller, means for removing heated material from the heating roller, means for guiding the heated material into the compression chamber of the molding machine, means for driving said rollers and means for controlling the duration of rotation of the grooved roller.

4. In the method of preparing thermosetting molding powder for briquetting, the steps comprising; feeding molding powder to a grooved roller, distributing a uniform thin layer of said molding powder from the grooved roller onto the surface of a heated rotating drum, controlling the thickness of said layer and simultaneously controlling the duration of rotation of said grooved roller whereby a predetermined quantity of molding powder is passed therethrough, carrying the relatively thin layer of molding powder onto the surface of said drum through a portion only of the rotation thereof for a time sufficient to bring the temperature of the molding powder to a temperature approximating the irreversible reaction temperature thereof, and then scraping the heated molding powder off the surface of said drum.

5. For use with an injection molding machine having a compression chamber, a doser comprising a source of supply of comminuted molding material, a rotating roller, and conveying means between said source and said roller for conveying a layer of comminuted material to the surface of said roller, means for heating the roller, means for removing the heated material from the roller, means for guiding the material removed from the heated roller into the compression chamber of a molding machine, means for determining the thickness of the layer of material conveyed by said conveyor to the heated roller, and means for controlling the duration of operation of the conveying means.

6. For use with an injection molding machine having a compression chamber, a doser comprising a source of supply of comminuted molding material, a rotating roller, means for heating the roller, a moving conveyor positioned between the source of supply and the rotating roller for conveying comminuted material from the source to the roller and for depositing it upon the roller in a uniform layer, a scraper for removing heated molding material from the roller after said material has been in contact with the roller a predetermined time, means for guiding the material heated by the roller and scraped therefrom into a compression chamber of a molding machine, means for determining the thickness of the layer of material deposited on the roller by said conveyor, a power source for the roller and the conveyor, and means for disconnecting said conveyor from said power source.

CHARLES A. NICHOLS.
MAX E. TODD.
WILLIAM A. FLETCHER.
CLARENCE J. KELLER.

References Cited in the file of this patent

UNITED STATES PATENTS

| Number | Name | Date |
|---|---|---|
| 208,272 | Spencer | Sept. 24, 1878 |
| 758,327 | Macklind | Apr. 26, 1904 |
| 1,001,072 | Du Pont | Aug. 22, 1911 |
| 2,127,070 | Pestalozza | Aug. 16, 1938 |
| 2,523,670 | Schueler | Sept. 26, 1950 |
| 2,526,634 | Chavannes | Oct. 24, 1950 |